(12) United States Patent
Hatta et al.

(10) Patent No.: US 7,297,441 B2
(45) Date of Patent: Nov. 20, 2007

(54) NONAQUEOUS-ELECTROLYTE SECONDARY BATTERY

(75) Inventors: Kazuhito Hatta, Miyagi (JP);
Tsuyonobu Hatazawa, Miyagi (JP);
Tomitaro Hara, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/655,121

(22) Filed: Sep. 4, 2003

(65) Prior Publication Data

US 2004/0043290 A1   Mar. 4, 2004

Related U.S. Application Data

(63) Continuation of application No. 09/582,064, filed on Nov. 27, 2000, now abandoned.

(51) Int. Cl.
*H01M 2/02* (2006.01)
*H01M 2/08* (2006.01)

(52) U.S. Cl. .................. 429/185; 429/162; 429/176

(58) Field of Classification Search ........... 429/162, 429/176, 185
See application file for complete search history.

(56) References Cited

U.S. PATENT DOCUMENTS

| | | | |
|---|---|---|---|
| 4,997,732 A * | 3/1991 | Austin et al. ........... | 429/153 |
| 5,498,489 A | 3/1996 | Dasgupta et al. | |
| 5,591,540 A * | 1/1997 | Louie et al. ........... | 429/163 |
| 6,106,973 A | 8/2000 | Sonozaki et al. | |
| 6,291,098 B1 * | 9/2001 | Shibuya et al. ........ | 429/163 |
| 6,461,757 B1 * | 10/2002 | Sasayama et al. ...... | 429/59 |
| 6,503,656 B1 * | 1/2003 | Bannai et al. ........ | 429/162 |

FOREIGN PATENT DOCUMENTS

| | | |
|---|---|---|
| JP | 7105950 A | 4/1995 |
| JP | 7262994 A | 10/1995 |
| JP | 9-63550 | 3/1997 |
| JP | 10097858 A | 4/1998 |
| JP | 10-157008 | 6/1998 |
| JP | 11-102675 | 4/1999 |
| WO | WO 9842036 A1 * | 9/1998 |

* cited by examiner

*Primary Examiner*—Gregg Cantelmo
(74) *Attorney, Agent, or Firm*—Sonnenschein Nath & Rosenthal LLP

(57) ABSTRACT

A nonaqueous-electrolyte battery which is capable of preventing introduction of water and deterioration in the capacity thereof is disclosed. The nonaqueous-electrolyte battery according to the present invention incorporates a case constituted by laminated films; and a unit cell which is accommodated in the case and having a structure that the peripheries of the case is sealed with heat, wherein when an assumption is made that the quantity of water capable of penetrating a heat-weld resin layer which is the innermost layer of the case having a thickness of T ($\mu$m) is R ($g/m^2 \cdot day$), the cross sectional area of resin in a heat-sealed portion is S ($cm^2$), an average width of the heat-sealed portion is W (cm) and the capacity of the unit cell is C (Wh), the following relationship is satisfied: $(T \times R \times S)/(W \times C) \leq 0.96$ $\mu g/Wh \cdot day$. When the foregoing structure is employed, water introducing rate can be reduced to 350 $\mu g$/year or lower per capacity (Wh).

16 Claims, 2 Drawing Sheets

NONAQUEOUS-ELECTROLYTE SECONDARY BATTERY

The present application is a continuation of U.S. patent application Ser. No. 09/582,064 filed Nov. 27, 2000 now abandoned.

TECHNICAL FIELD

The present invention relates to a nonaqueous-electrolyte battery incorporating a case constituted by laminated films in which a unit cell is accommodated.

BACKGROUND ART

In recent year, a variety of portable electronic apparatuses represented by a notebook personal computer have been structured into cordless and portable forms. Thus, a variety of small thickness, compact size and light weight portable electronic apparatuses have sequentially been developed. Since the apparatuses have considerably varied, the quantity of electric power which is required for the apparatuses has been enlarged. Hence it follows that batteries which are energy sources for the apparatuses, in particular, secondary batteries are required to have larger capacities.

As conventional secondary batteries, lead batteries and nickel-cadmium batteries have been known. Moreover, new secondary batteries, such as nickel-hydrogen batteries and lithium-ion batteries, have been put into practical use. The foregoing secondary batteries each of which incorporates solution to serve as the electrolyte thereof, however, suffer from a problem of leakage of liquid.

To solve the above-mentioned problem, a polymer lithium-ion secondary battery incorporating polymer gel swelled by the electrolytic solution and serving as the electrolyte has been developed. Since the polymer lithium-ion battery has been developed, the problem of the leakage of the solution from the battery can be prevented. Thus, a small size, light weight, small thickness and high energy-density secondary battery can be realized.

The structure of the polymer lithium-ion secondary battery will now be described. A collector for the positive electrode made of a thin aluminum plate incorporates active materials composed of $LiCoO_2$ and graphite and laminated thereon. Moreover, active materials composed of carbon, cokes, graphite and so forth are laminated on the collector for the negative electrode made of a thin copper plate. Therefore, the electrodes are constituted. Moreover, a separator made of polypropylene or polyethylene and structured into a thin film having pores is sandwiched between the electrodes. In addition, a polymer gel electrolyte, such as polyacrylonitrile (PAN), polyethylene oxide (PEO) or polyvinylidene fluoride (PVDF), is enclosed in spaces among the electrodes and the separator. Thus, the polymer lithium-ion secondary battery has a sandwich structure.

The unit cell having the sandwich structure is packaged into a case serving as an encapsulating container and constituted by a thin metal film, such as aluminum foil, and a plastic film made of nylon, polyethylene, polypropylene or polyethylene terephthalate.

When the aluminum laminate pack is employed to serve as the case for the lithium-ion battery, reduction in the weight and thickness can be realized. A larger quantity of water, however, introduced into the aluminum laminate pack as compared with the conventional metal container (a battery can). Hence it follows that lithium ions are consumed owing to decomposition of water and decomposed gases and hydrofluoric acid are produced. Therefore, there arises a problem in that the capacity of the battery is reduced excessively.

When water in a quantity of 350 μg or greater per capacity (Wh) of the battery is introduced, the capacity is reduced to 80% or smaller. Therefore, a requirement has arisen for a battery package free from reduction in the capacity, that is, with which the quantity of water which will undesirably be introduced into the battery package can be reduced to a value which is not larger than the above-mentioned value.

DISCLOSURE OF THE INVENTION

In view of the foregoing, an object of the present invention is to provide a nonaqueous-electrolyte battery which is able to prevent introduction of water and reduction in the capacity.

To achieve the above-mentioned object, the inventors of the present invention have energetically performed investigations for a long time. As a result, a fact was detected that introduction of water is caused from diffusion of a heat-welded portion into resin. Therefore, use of heat-weld resin and reduction in the area into which water will be diffused enable the water introducing rate to be reduced to 350 μg/year or smaller per capacity (Wh). Thus, the present invention has been established.

According to one aspect of the present invention, there is provided a nonaqueous-electrolyte battery comprising: a case constituted by laminated films; and a unit cell which is accommodated in the case and having a structure that the peripheries of the case is sealed with heat, wherein when an assumption is made that the quantity of water capable of penetrating a heat-weld resin layer which is the innermost layer of the case having a thickness of T (μm) is R (g/m²·day), the cross sectional area of resin in a heat-sealed portion is S (cm²), an average width of the heat-sealed portion is W (cm) and the capacity of the unit cell is C (Wh), the following relationship is satisfied:

$$(T \times R \times S)/(W \times C) \leq 0.96 \ \mu g/Wh \cdot day.$$

When the foregoing setting is employed, the water introducing rate can be reduced to 350 μg/year per capacity (Wh). As a result, consumption of lithium ions and production of decomposed gases and hydrofluoric acid which take place owing to decomposition of water can be prevented, causing reduction in the capacity of the battery to be prevented.

BEST MODE FOR CARRYING OUT THE INVENTION

The structure of a nonaqueous-electrolyte battery according to the present invention will now be described with reference to the drawings.

Figure 1:
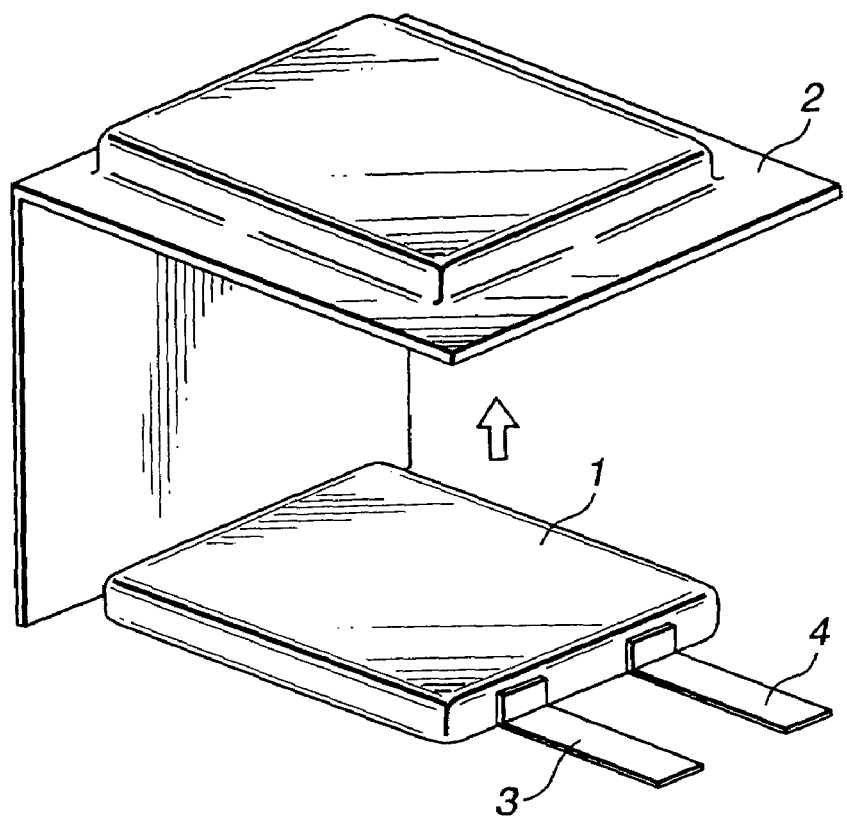
FIG. 1 is an exploded perspective view showing an example of the structure of a solid-electrolyte battery according to the present invention.
Figure 2:
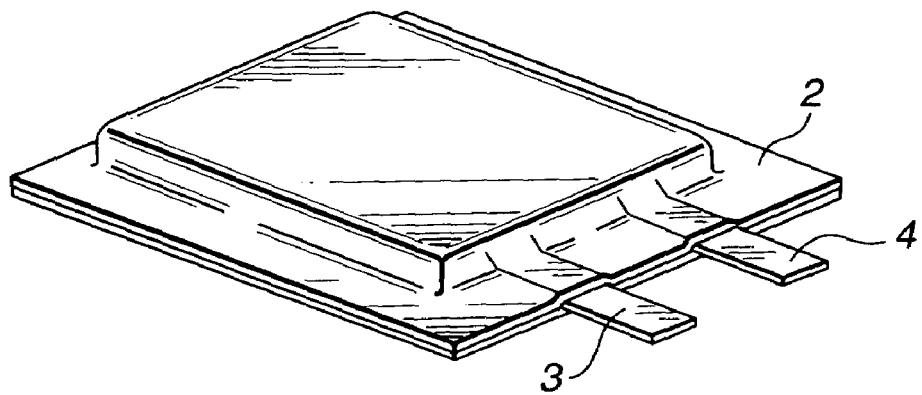
FIG. 2 is a schematic perspective view showing the example of the structure of the solid-electrolyte battery according to the present invention.

The nonaqueous-electrolyte battery according to the present invention is, for example, a solid-electrolyte battery or a gel electrolyte battery. As shown in FIGS. 1 and 2, a unit cell 1 incorporates a solid electrolyte or a gel electrolyte disposed between a positive-electrode active material layer and a negative-electrode active material layer. The unit cell 1 is accommodated in a case 2 constituted by laminated films such that the periphery of the case 2 is welded with heat.

The unit cell 1 is provided with a negative-terminal lead 3 which is electrically connected to a negative electrode which constitutes the unit cell 1 and a positive-terminal lead 4 which is electrically connected to a positive electrode which constitutes the unit cell 1. The negative and positive-electrode leads 3 and 4 are drawn out to the outside portion of the case 2.

Figure 3:
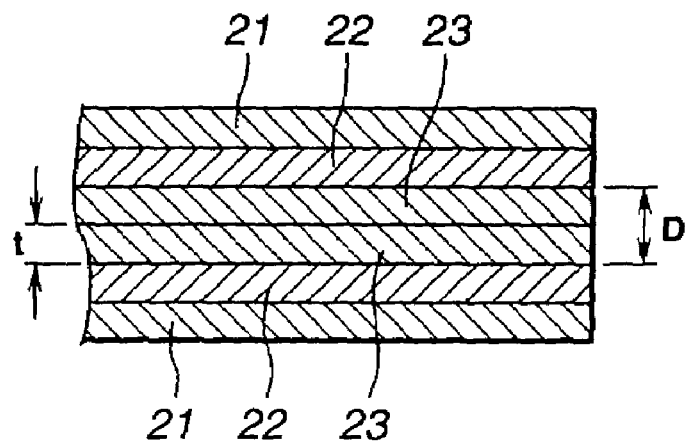
FIG. 3 is a cross sectional view showing an example of the structure of a case.

The case 2 according to the present invention, for example, as shown in FIG. 3, has a structure formed by bonding plastic films 21 and 23 to a thin metal film 22. The plastic film (the heat-weld resin layer) 23 is provided for the purpose of sealing the inside portion thereof, into which the unit cell 1 has been encapsulated, by performing heat welding. The plastic film 23 is made of polyolefine resin, such as polyethylene, polypropylene, denatured polyethylene or denatured polypropylene.

Since introduction of water is mainly caused from diffusion occurring in the resin, the present invention is structured such that the width and length of the seal and the like are optimized. The design is performed such that when an assumption is made that the quantity of water capable of penetrating a heat-welded layer which is the innermost layer of the case having a thickness of T (cm) is R (g/m$^2$·day), the cross sectional area of resin in a heat-sealed portion is S (cm$^2$), an average width of the heat-sealed portion is W (cm) and the capacity of the unit cell is C (Wh), the following relationship is satisfied:

$$(T \times R \times S)/(W \times C) \leq 0.96 \; \mu g/Wh \cdot day.$$

The area S of the heat-sealed portion is determined by the distance D between metal foil members and the length L of the metal foil in the heat-welded portion of the case 2.

As shown in FIG. 3, the distance D between the metal foil members is substantially determined by the thickness t of titanate plastic film 23 which is the heat-weld resin layer. The distance D between the metal foil members varies depending on the heat welding conditions.

The length L of the sealing portion is a length $L_1 + L_2 + L_3$ of the inside portions of the sealed portion 10 which is formed by the heat-weld resin layer. Therefore, the cross sectional area S of the resin can be expressed as follows:

$$S = D \times (L_1 + L_2 + L_3)$$

Figure 4:
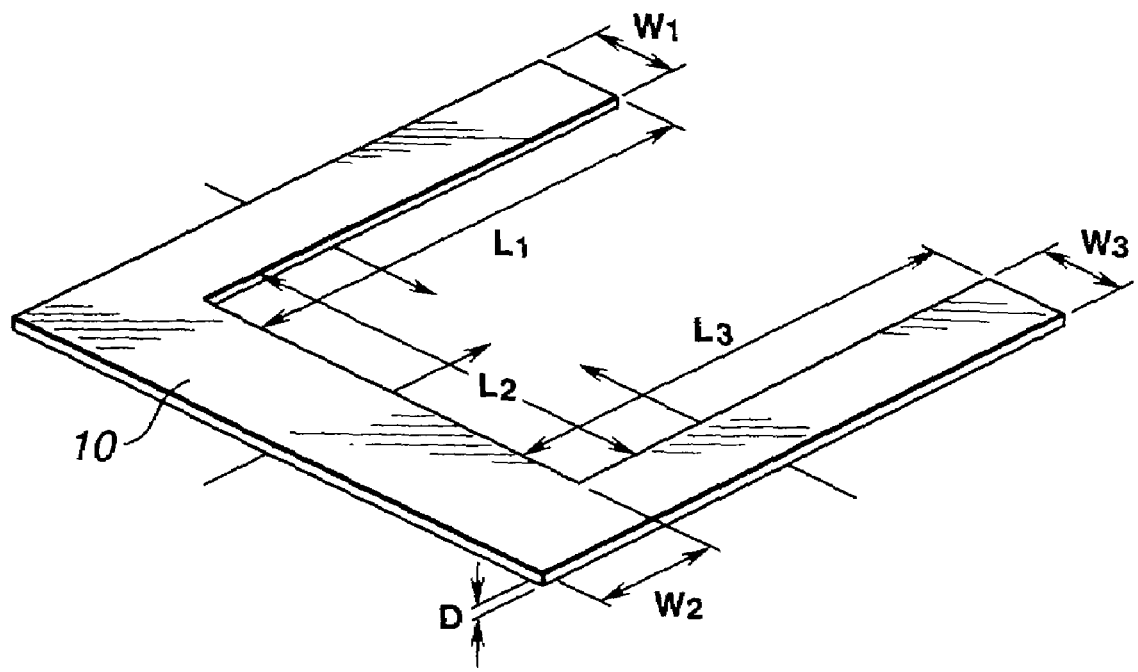
FIG. 4 is a schematic view showing a sealed portion.

Also the width W of the heat-sealed portion is as shown in FIG. 4. When the width varies among the sealed portions, for example, an average value of $W_1$, $W_2$ and $W_3$ may be used to calculate the width W.

The quantity of water which will be introduced into the pack substantially depends on the cross sectional area of the heat-weld resin exposed to the atmosphere and the width of the seal. Therefore, a battery container is structured such that resin of a type having a moisture proofing characteristic is employed as the resin in the sealed portion which is the major portion through which moisture is introduced. Moreover, the area of the end surface is minimized and the thickness of the container is reduced. When the foregoing structure is employed, introduction of moisture can be prevented.

The foregoing value of $(T \times R \times S)/(W \times C)$ is a value indicating the quantity of water which penetrates the resin per unit capacity and unit time (day). The material, thickness and the width of the seal are determined to make the value to be 0.96 μg/Wh·day (=350 μg/Wh·year). Thus, the water introducing rate can be made to be 350 μg/year per the capacity of 1 Wh of the battery. Therefore, a lithium-ion secondary battery can be provided which is capable of realizing a capacity retention ratio of 80% or higher after a lapse of one year, that is, exhibiting excellent moisuture proofing characteristics and capable of significantly preventing reduction in the capacity.

In consideration of the sealing characteristics required for the sealing portion, it is preferable that the distance D between the metal foil portions is 20 μm to 200 μm. It is preferable that the width W of the seal is 2 mm or longer.

When the battery element 1 is a solid electrolyte battery or a gel electrolyte battery, a polymer material for preparing the solid polymer electrolyte may be any one of the following materials: silicon gel, acrylic gel, acrylonitrile gel, polyphosphagen denatured polymer, polyethylene oxide, polypropylene oxide, their composite polymer, crosslinked polymer, denatured polymer, fluorine polymer, for example, poly (vinylidene fluoride), poly (vinylidene fluoride-co-hexafluoropolypropylene), poly (vinylidene fluoride-co-tetrafluoroethylene) and poly (vinylidenefluoride-co-trifluoroethyelene). Also a mixed material of the foregoing materials may be employed. As a matter of course, the polymer material is not limited to the foregoing material.

A method of obtaining the solid electrolyte or the gel electrolyte laminated on the positive-electrode active material layer or the negative-electrode active material layer will now be described. Solution is prepared which is composed of a polymer compound, salt of electrolyte and solvent (and a plasticizer in a case of the gel electrolyte). Then, positive-electrode active material layer or the negative-electrode active material layer is impregnated with the foregoing solution. Then, the solvent is removed so that a solid electrolyte is obtained. The positive-electrode active material layer or the negative-electrode active material layer is impregnated with a portion of the solid electrolyte laminated on the positive-electrode active material layer or the negative-electrode active material layer so that the foregoing electrolyte is solidified. When the crosslinking type material is employed, light or heat is used to realize crosslinking so that a solid material is obtained.

The gel electrolyte is composed of the plasticizer containing lithium salt and a matrix polymer in a quantity not less than 2 wt % nor more than 30 wt %. To obtain the gel electrolyte, ester, ether or carbonic ester may solely be employed or as one of the components of the plasticizer.

The matrix polymer for gelling the carbonic ester in the process for preparing the gel electrolyte may be any one of polymers for use to constitute the gel electrolyte. From a viewpoint of stability of oxidation and reduction, it is preferable that fluorine polymer, for example, poly (vinylidenefluoride) or poly (vinylidenefluoride-co-hexafluoropolypropylene), is employed.

The solid polymer electrolyte is composed of lithium salt and the polymer compound for dissolving the lithium salt. The polymer compound may be any one of the following materials: ether polymer such as poly (ethylene oxide) or its crosslinked material or fluorine type polymer such as poly (methacrylate) ester, acrylate, poly (vinylidenefluoride) and poly (vinylidenefluoride-co-hexafluoropolypropylene). The foregoing material may be employed solely or the materials may be mixed. From a viewpoint of the stability of oxidation and reduction, it is preferable that the fluorine polymer, such as poly (vinylidenefluoride) or poly (vinylidenefluoride-co-hexafluoropolypropylene), is employed.

The lithium salt which is contained in the gel electrolyte or the polymer solid electrolyte may be lithium salt for use in a usual electrolytic solution of a battery. The lithium compound (salt) is exemplified by the following materials. Note that the present invention is not limited to the following materials.

The lithium compound (salt) is exemplified by: lithium chloride, lithium bromide, lithium iodide, lithium chlorate, lithium perchlorate, lithium bromate, lithium iodate, lithium nitrate, lithium tetrafluoroborate, lithium hexafluorophosphate, lithium acetate, bis (trifluoromethanesulfonyl) imidolithium, $LiAsF_6$, $LiCF_3SO_3$, $LiC(SO_2CF_3)_3$, $LiAlCl_4$ or $LiSiF_6$.

The foregoing lithium compound may be employed solely or a plurality of the lithium compounds may be mixed. It is preferable that $LiPF_6$ or $LiBF_4$ is employed from a viewpoint of stability of oxidation and reduction.

The lithium salt is dissolved at a concentration of 0.1 mol to 3.0 mol in the plasticizer in a case of the gel electrolyte, preferably 0.5 mol/liter to 2.0 mol/liter.

The battery according to the present invention can be constituted by a method similar to a method for constituting a conventional lithium ion battery except for the structure of the present invention in which the foregoing gel electrolyte or the solid electrolyte is employed.

The material of the negative electrode of the lithium ion battery may be a material which is able to dope/dedope lithium. The foregoing material of the negative electrode may be a carbon material, such as non-graphitizing carbon or a graphite material. Specifically, any one of the following carbon materials may be employed: pyrocarbon; cokes (pitch cokes, needle cokes or petroleum cokes); graphite; vitreous carbon, a sintered compact of an organic polymer compound (a material obtained by sintering phenol resin or furan resin at a proper temperature so as to be carbonized); carbon fiber and active carbon. As an alternative to this, the material which is able to dope/dedope lithium may be a polymer material, such as polyacetylene or polypyrrole, or oxide, such as $SnO_2$. When the negative electrode is manufactured from any one of the foregoing material, a known binder and the like may be added.

The positive electrode may be manufactured by using metal oxide, metal sulfide or a specific polymer to correspond to the type of the required battery. When the lithium ion battery is manufactured, the active material of the positive electrode may be any one of the following materials: metal sulfide or oxide which does not contain lithium, for example, $TiS_2$, $MoS_2$, $NbSe_2$ or $V_2O_5$; or composite lithium oxide mainly composed of $Li_xMO_2$ (where M is one or more types of transition metal and x which varies depending on the state of charge/discharge of the battery is usually not less than 0.05 nor more than 1.10). It is preferable that the transition metal M which constitutes the composite lithium oxide is Co, Ni, Mn or the like. The composite lithium oxide is exemplified by $LiCoO_2$, $LiNiO_2$, $LiNi_yCo_{1-y}O_2$ (where 0<y<1) and $LiMn_2O_4$. The foregoing composite lithium oxide is an active material for the positive electrode which is capable of generating high voltage and which exhibits a satisfactory energy density. Plural types of the foregoing active materials may be contained in the positive electrode. When the active material is employed to manufacture the positive electrode, a known conductive material and a binder may be added.

Examples and comparative examples of the present invention will now be described on the basis of results of experiments.

EXAMPLE 1

The negative electrode was manufactured as follows.

Ninety parts by weight of graphite powder obtained by pulverization and 10 parts by weight of poly (vinylidene fluoride-co-hexafloropropylene) serving as a binder were mixed so that a negative-electrode mix was prepared. Then, the negative-electrode mix was dispersed in N-methyl-2-pyrrolidone so as to be slurried. The slurry was uniformly applied to either side of elongated copper foil having a thickness of 10 μm and serving as a collector for the negative electrode. Then, the applied side was dried, and then the structure was compressed and molded by a roll pressing machine. Then, a 52 mm×320 mm portion was obtained by cutting.

On the other hand, the positive electrode was manufactured as follows.

To obtain the positive-electrode active material ($LiCoO_2$), lithium carbonate and cobalt carbonate were mixed at a molar ratio 0.5:1. Then, the mixture was baked at 900° C. in the air for 5 hours. Then, 91 parts by weight of obtained $LiCoO_2$, 6 parts by weight of graphite serving as a conductor and 10 parts by weight of poly (vinylidene fluoride-co-hexafloropropylene) serving as a binder were mixed with one another. Thus, a positive-electrode mix was prepared. The positive-electrode mix was dispersed in N-methyl-2-pyrrolidone so as to be slurried. The slurry was uniformly applied to either side of elongated aluminum foil which was a collector for the positive electrode and having a thickness of 20 μm. Then, the applied side was dried, and then the structure was compressed and molded by a roll pressing machine. Then, a 50 mm×300 mm portion was obtained by cutting.

The gel electrolyte was obtained as follows.

The negative electrode and the positive electrode were uniformly coated and impregnated with solution prepared by mixing and dissolving 10 parts by weight of poly (vinylidene fluoride-co-hexafloropropylene) having a weight average molecular weight Mw of 600,000 and 60 parts by weight of dimethyl carbonate in a plasticizer composed of 42.5 parts by weight of ethylene carbonate (EC), 42.5 parts by weight of propylene carbonate (PC) and 15 parts by weight of $LiPF_6$. Then, the negative and positive electrodes were allowed to stand at room temperature for 8 hours to vaporize and remove dimethyl carbonate. Thus, the gel electrolyte was obtained.

The negative and positive electrodes each of which was coated with the sol electrolyte and which had the gel electrolyte film by vaporizing the solvent were placed opposite to each other and wound flat so that unit cell having a capacity of 2 Wh was manufactured.

The unit cell was sealed in a laminate sheet having size of 7 cm×14 cm and incorporating the heat weld resin which was a high-density polyethylene (moisture vapor permeability of 20 $g/m^2$·day when the thickness T was 20 μm) having a thickness of 100 μm. The laminate sheet was folded back into the lengthwise direction such that the heat weld resin was disposed on the inside. Then, the three sides were vacuum-sealed to create a cell accommodating portion having a size of 4 cm×4 cm. Therefore, the sealing length of one side was 4 cm, the number of the sides was three and the total sealing length was 12 cm.

A resin member was applied to the electrode terminal at a position at which the terminal intersects the heat weld portion of the casing film. Thus, occurrence of short circuit caused from burrs or the like can be prevented. Moreover, the adhesive properties between the terminal and the laminate film were improved.

The sealing process was performed under conditions that the temperature was 200° C., the duration was 5 seconds and the sealing width was 5 mm. The distance D between metal foil members was 200 μm or shorter. Then, the pack was preserved for one year in an environment in which the temperature was 23° C. and the humidity was 55%. The changes in the capacity of the battery and the quantity of the moisture content were measured by a Karl Fischer technique.

EXAMPLE 2

A battery was manufactured similarly to Example 1 except for the conditions according to Example 1 which were changed such that the thickness of the high-density polyethylene was 40 μm and the sealing process was performed such that the distance D between the metal foil members which was 70 μm. Then, the manufactured battery was evaluated.

EXAMPLE 3

A battery was manufactured similarly to Example 1 except for the conditions according to Example 1 which were changed such that the thickness of the high-density polyethylene was 15 μm and the sealing process was performed such that the distance D between the metal foil members which was 20 μm. Then, the manufactured battery was evaluated.

EXAMPLE 4

A battery was manufactured by a method similar to the method according to Example 2 except for the conditions according to Example 2 which were changed such that width of the seal was 0.3 cm. The manufactured battery was evaluated.

EXAMPLE 5

A battery was manufactured by a method similar to the method according to Example 2 except for the conditions according to Example 2 which were changed such that width of the seal was 0.2 cm. The manufactured battery was evaluated.

COMPARATIVE EXAMPLE 1

A battery was manufactured similarly to Example 1 except for the conditions according to Example 1 which were changed such that the thickness of the high-density polyethylene was 120 μm and the sealing process was performed such that the distance D between the metal foil members which was more than 200 μm. Then, the manufactured battery was evaluated.

COMPARATIVE EXAMPLE 2

A battery was manufactured similarly to Example 1 except for the conditions according to Example 1 which were changed such that the thickness of the high-density polyethylene was 10 μm and the sealing process was performed such that the distance D between the metal foil members which was less than 20 μm. Then, the manufactured battery was evaluated.

COMPARATIVE EXAMPLE 3

A battery was manufactured by a method similar to the method according to Example 1 except for low-density polyethylene (having a rate of penetration of moisture of 30 g/m²·day per thickness T of 20 μm) which was employed as a substitute for the high-density polyethylene. The manufactured battery was evaluated.

COMPARATIVE EXAMPLE 4

A battery was manufactured by a method similar to the method according to Example 3 except for the width of the seal which was 1.5 mm in this example. The manufactured battery was evaluated.

Results of the evaluation of the samples were shown in Table 1.

TABLE 1

| | Distance between metal foil potions D (mm) | Total sealing length L (mm) | Cross sectional area of resin in a heat-sealed portion S (mm²) | Moisture vapor permeability R (g m$^{-2}$ d$^{-1}$) | Width of the seal W (cm) | Capacity C (Wh) | Calculated introduced water TRS/WC (μg Wh$^{-1}$ d$^{-1}$) | Observed capacity retention ratio after one year % | Observed introduced water after one year (μg Wh$^{-1}$yr$^{-1}$) |
|---|---|---|---|---|---|---|---|---|---|
| Ex. 1 | 0.184 | 120 | 22.08 | 20 | 0.5 | 2 | 0.88 | 87 | 293 |
| Ex. 2 | 0.07 | 120 | 8.4 | 20 | 0.5 | 2 | 0.34 | 91 | 112 |
| Ex. 3 | 0.021 | 120 | 2.52 | 20 | 0.5 | 2 | 0.10 | 95 | 33 |
| Ex. 4 | 0.07 | 120 | 8.4 | 20 | 0.3 | 2 | 0.56 | 92 | 186 |
| Ex. 5 | 0.07 | 120 | 8.4 | 20 | 0.2 | 2 | 0.84 | 88 | 279 |
| Comp. Ex. 1 | 0.211 | 120 | 25.32 | 20 | 0.5 | 2 | 1.01 | 72 | 336 |
| Comp. Ex. 2 | 0.015 | 120 | 1.8 | 20 | 0.5 | 2 | 0.07 | 61 | 966 |
| Comp. Ex. 3 | 0.184 | 120 | 22.08 | 30 | 0.5 | 2 | 1.32 | 65 | 440 |
| Comp. | 0.021 | 120 | 2.52 | 20 | 0.15 | 2 | 0.34 | 58 | 1089 |

TABLE 1-continued

| | Distance between metal foil potions D (mm) | Total sealing length L (mm) | Cross sectional area of resin in a heat-sealed portion S (mm²) | Moisture vapor permeability R (g m⁻² d⁻¹) | Width of the seal W (cm) | Capacity C (Wh) | Calculated introduced water TRS/WC (μg Wh⁻¹ d⁻¹) | Observed capacity retention ratio after one year % | Observed introduced water after one year (μg Wh⁻¹yr⁻¹) |
|---|---|---|---|---|---|---|---|---|---|
| Ex. 4 | | | | | | | | | |

The quantity of introduced water substantially depended on the moisture penetration characteristics of the resin in the heat-welded portion and the width of the seal. Comparative Example 1 incorporated the resin having a cross sectional area larger than that in Example 1 and the value of (T×R×S)/(W×C) which was larger than 0.96 μg/Wh·day. Therefore, the capacity of Comparative Example was reduced considerably. Examples 2 and 3 having the reduced cross sectional area was able to efficiently prevent reduction in the capacity. In Comparative Example 3, the thickness of the sealing resin was a small value of 10 μm. Therefore, a satisfactory sealing characteristic could not be maintained. Although the design was performed such that the foregoing value was 0.96 μg/Wh·day or smaller, water in a large quantity was introduced and, therefore, the battery deteriorated. As for the width of the seal, Comparative Example 4 arranged to have the width of 1.5 mm could not maintain satisfactory sealing characteristics. Therefore, water in a large quantity was introduced. Hence it follows that the thickness of the sealing resin must be 20 μm to 200 μm and the width of the seal must be 2 mm or larger.

As can be understood from the foregoing description, according to the present invention, a nonaqueous-electrolyte battery which is able to prevent introduction of water and reduction in the capacity can be provided.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

The invention claimed is:

1. A nonaqueous-electrolyte battery comprising:
a unit cell with a capacity (C); and
a case accommodating the unit cell, said case comprising at least one plastic film layer A; said case being folded along a plane such that A faces itself thereby forming an opposing section A'; said unit cell being disposed between A and A'; a portion of A and A' being heat-sealed together along at least a portion of a periphery of said accommodated unit cell; said heat sealed-portion of said case having a thickness (D) of from 20 μm to 200 μm, a moisture vapor permeability (R) as measured on a plastic film layer of thickness (T), an inner peripheral sealing length (L), a cross-sectional area (S) calculated as D×L, and an average heat-sealed portion width (W) of 2 mm to 5 mm;
wherein said case has a water penetration rate, as calculated by (T×R×S)/(W×C), of less than 0.96 μg per day per unit capacity of said battery.

2. The nonaqueous-electrolyte battery according to claim 1, wherein said plastic film layer A comprises a polyolefin resin.

3. The nonaqueous-electrolyte battery according to claim 2, wherein the polyolefin resin is selected from the group consisting of polypropylene, polyethylene, denatured polypropylene, denatured polyethylene, and mixtures thereof.

4. The nonaqueous-electrolyte battery according to claim 1, wherein the cell comprises a gel or solid electrolyte which contains a matrix polymer and lithium salt.

5. The nonaqueous-electrolyte battery according to claim 1, wherein the cell comprises a negative electrode that contains a negative electrode active material which is capable of doping and dedoping lithium.

6. The nonaqueous-electrolyte battery according claim 5, wherein the negative electrode active material comprises material a carbon material.

7. The nonaqueous-electrolyte battery according claim 1, wherein the cell comprises a positive electrode that contains a positive electrode composite oxide of lithium and a transition metal.

8. The nonaqueous-electrolyte battery according claim 1, wherein said thickness (D) of said heat-sealed portion of said case is from 20 μm to 70 μm.

9. The nonaqueous-electrolyte battery according claim 1, wherein said moisture vapor permeability R is 20 gm⁻²d⁻¹, as measured at thickness T of 20 μm.

10. The nonaqueous-electrolyte battery according claim 1, wherein said capacity C of said unit cell is 2 Wh.

11. The nonaqueous-electrolyte battery according claim 1, wherein said unit cell retains at least 87% capacity after storage for one year at 23° C. and 55% relative humidity.

12. The nonaqueous-electrolyte battery according claim 1, wherein said case has a water penetration rate, as calculated by (T×R×S)/(W×C), of less than 0.88 μg per day per unit capacity of said battery.

13. The nonaqueous-electrolyte battery according claim 1, wherein said case has a water penetration rate, as calculated by (T×R×S)/(W×C), of less than 0.56 μg per day per unit capacity of said battery.

14. The nonaqueous-electrolyte battery according claim 1, wherein said case has a water penetration rate, as calculated by (T×R×S)/(W×C), of less than about 0.34 μg per day per unit capacity of said battery.

15. The nonaqueous-electrolyte battery according claim 1, wherein said case comprises at least two plastic film layers A and B bonded to a metal film layer such that the metal film layer is sandwiched between A and B and thickness (D) is measured as a distance between opposing portions of the metal film layer.

16. A nonaqueous-electrolyte battery comprising:
a unit cell with a capacity (C); and a case accommodating the unit cell, said case comprising at least two plastic film layers A and B bonded to a metal film layer such that the metal film layer is sandwiched between A and B; said case being folded along a plane such that A faces itself thereby forming an opposing section A'; said unit cell being disposed between A and A'; a portion of A and A' being heat-sealed together along at least a portion of a periphery of said accommodated unit cell; said heat sealed-portion of said case having a thickness (D) of from 20 µm to 70 µm measured as a distance between opposing portions of the metal film layer, a moisture vapor permeability (R) of 20 $gm^{-2}d^{-1}$ as measured on a plastic film layer with thickness (T) of 20 µm, an inner peripheral sealing length (L), a cross-sectional area (S) calculated as D×L, and an average heat-sealed portion width (W) of 2 mm to 5 mm;

wherein said case has a water penetration rate, as calculated by (T×R×S)/(W×C), of less than about 0.96 µg per day per unit capacity of said battery and said unit cell retains at least 87% capacity after storage for one year at 23° C. and 55% relative humidity.

* * * * *